(12) United States Patent
Liu (10) Patent No.: US 10,492,569 B2
(45) Date of Patent: Dec. 3, 2019

(54) SOLE MEASURING DEVICE

(71) Applicant: Yi-Hsien Liu, Taipei (TW)

(72) Inventor: Yi-Hsien Liu, Taipei (TW)

( * ) Notice: Subject to any disclaimer, the term of this patent is extended or adjusted under 35 U.S.C. 154(b) by 231 days.

(21) Appl. No.: 15/858,838

(22) Filed: Dec. 29, 2017

(65) Prior Publication Data

US 2019/0082794 A1    Mar. 21, 2019

(30) Foreign Application Priority Data

Sep. 21, 2017 (TW) .............................. 106132500 A (51) Int. Cl.
| | | |
|---|---|---|
| *A61B 5/107* | (2006.01) | |
| *A43D 1/02* | (2006.01) | |
| *G01B 5/20* | (2006.01) | |
| *G01B 11/24* | (2006.01) | |
| *G01B 21/20* | (2006.01) | |
| *H04N 7/18* | (2006.01) | |

(52) U.S. Cl.
CPC .............. *A43D 1/025* (2013.01); *G01B 5/20* (2013.01); *G01B 11/24* (2013.01); *G01B 21/20* (2013.01); *H04N 7/185* (2013.01)

(58) Field of Classification Search
CPC ............................... A43D 31/02; A43D 31/025
USPC ............................. 33/514.2, 3 R, 4, 5, 6, 3 A
See application file for complete search history.

(56) References Cited

U.S. PATENT DOCUMENTS

| | | | | |
|---|---|---|---|---|
| 4,819,644 A | * | 4/1989 | Cherniak | A61F 5/019 33/5 |
| 6,160,264 A | * | 12/2000 | Rebiere | A61B 5/1074 12/1 R |
| 6,892,574 B1 | * | 5/2005 | Lo | A61B 5/1036 33/515 |
| 2004/0081336 A1 | * | 4/2004 | Brooks | A43D 1/025 382/111 |
| 2008/0028625 A1 | * | 2/2008 | Nudelman | A43D 1/022 33/515 |
| 2010/0286951 A1 | * | 11/2010 | Danenberg | A43D 1/025 702/172 |
| 2012/0174423 A1 | * | 7/2012 | Yang | A43D 1/02 33/512 |
| 2013/0192071 A1 | * | 8/2013 | Esposito | A61B 5/1036 33/6 |
| 2015/0059214 A1 | * | 3/2015 | Donovan | A43B 1/0027 36/100 |
| 2015/0131865 A1 | * | 5/2015 | Ye | A61B 5/1074 382/106 |
| 2018/0168288 A1 | * | 6/2018 | Gilbertson | B29C 33/3821 |
| 2019/0139252 A1 | * | 5/2019 | Zaiss | A43B 1/04 |

* cited by examiner

*Primary Examiner* — George B Bennett
(74) *Attorney, Agent, or Firm* — C. G. Mersereau; DeWitt LLP (57) ABSTRACT

A sole measuring device includes a slow recovery memory unit configured to receive a foot sole and to create a foot print, an alignment unit connected to the slow recovery memory unit used for indicating an alignment position of the foot, and a scale unit connected to the slow recovery memory unit used for providing a scale mark. The present invention is able to measure not only foot length but also foot width precisely, as well as foot arch can be inferred properly.

10 Claims, 9 Drawing Sheets

SOLE MEASURING DEVICE

SUMMARY OF THE INVENTION

A sole measuring device includes a slow recovery memory unit configured to receive a foot sole and to create a foot print, an alignment unit connected to the slow recovery memory unit used for indicating an alignment position of the foot, and a scale unit connected to the slow recovery memory unit used for providing a scale mark. The present invention is able to measure not only foot length but also foot width precisely, as well as foot arch can be inferred properly.

FIELD OF THE INVENTION

The present invention is related to the field of measurement, particularly, to a device for measuring a sole.

BACKGROUND OF THE INVENTION

The daily activities of walking and exercising can cause significant pressure on our feet. Without the proper shoes and/or insoles to disperse and relieve the foot pressure, it can cause discomfort to the body; consequently, people are likely to feel exhausted or pain. Even cause plantar lesion or; furthermore, may lead to joint injuries of legs and lower back etc.

The lengths, widths and/or arch type vary among groups of different ages and different body shapes. In general, most people do not have enough professional knowledge to measure their own foot length, foot width and their own arch type properly. As a result, most consumers can only choose their size of shoes and insoles from a limited selection by physically fitting them in shoe stores. Furthermore, it is impossible for most people to obtain the accurate data in order to find out the proper parameters corresponding to their feet or even customize shoes and insoles fit to their feet.

In view of the above, the present invention provides a sole measuring device capable of measuring the foot length, foot width and foot arch information in order to improve the aforementioned drawbacks.

SUMMARY OF THE INVENTION

In one aspect of the present invention, a sole measuring device is provided. The sole measuring device comprises: a slow recovery memory unit configured to receive a foot sole and to create a foot print; an alignment unit connected to the slow recovery memory unit used for indicating an alignment position of the foot; and a scale unit connected to the slow recovery memory unit used for providing a scale mark.

In a preferred embodiment, the sole measuring device further includes a sensing unit arranged above the slow recovery memory unit for detecting the foot print to provide a sole measuring information.

In a preferred embodiment, wherein the sensing unit is an optical sensor.

In a preferred embodiment, wherein the sensing unit is a distance sensor.

In a preferred embodiment, wherein the sensing unit is a temperature sensor.

In a preferred embodiment, wherein the sole measuring information is any one of a foot length information, a foot width information, an arch information or a combination thereof.

In the preferred embodiment, the sole measuring device further comprises a processing unit and a pressure sensing unit; wherein the processing unit is connected to the pressure sensing unit, the pressure sensing unit is attached onto the slow recovery memory unit, and the sole measuring device is configured in the way that when the pressure sensing unit detects that the foot sole has moved away from the slow recovery memory unit, then the processing unit commands the sensing unit to detect the foot print. In a preferred embodiment, the sole measuring device further comprises a processing unit, a pressure sensing unit, a timer and a storage unit; wherein the pressure sensing unit, the timer and the storage unit are connected to the processing unit, the pressure sensing unit is attached onto the slow recovery memory unit, a specific time interval information was stored in the storage unit, and the sole measuring device is configured in such a way that when the pressure sensing unit detects that the foot sole has moved away from the slow recovery memory unit and when the timer meets a specific time interval, then the processing unit commands the sensing unit to detect the foot print.

In a preferred embodiment, the sole measuring device further comprises a pressure sensing unit and a transmission unit; wherein the pressure sensing unit is attached onto the slow recovery memory unit, and the pressure sensing unit is connected to the transmission unit, the transmission unit is connected to a cloud computing via a wired or wireless method, and the sole measuring device is configured in the way when the pressure sensing unit detects that the foot sole has moved away from the slow recovery memory unit, then the cloud computing commands the sensing unit to detect the foot print.

In the preferred embodiment, the sole measuring device further comprises a housing surrounds the slow recovery memory unit or configured at a lower portion of the slow recovery memory unit.

DETAILED DESCRIPTION OF THE INVENTION

The following provides a detailed description of the embodiments along with the accompanied drawings to facilitate the understanding of the technical features and effects of the present invention. It shall be noted that, a person ordinarily skilled in the technique in this field of the present patent application can understand that the details of all units and steps can be not depicted and described in detail for clear illustration and easy understanding in order to prevent repeating and confounding.

Figure 1:
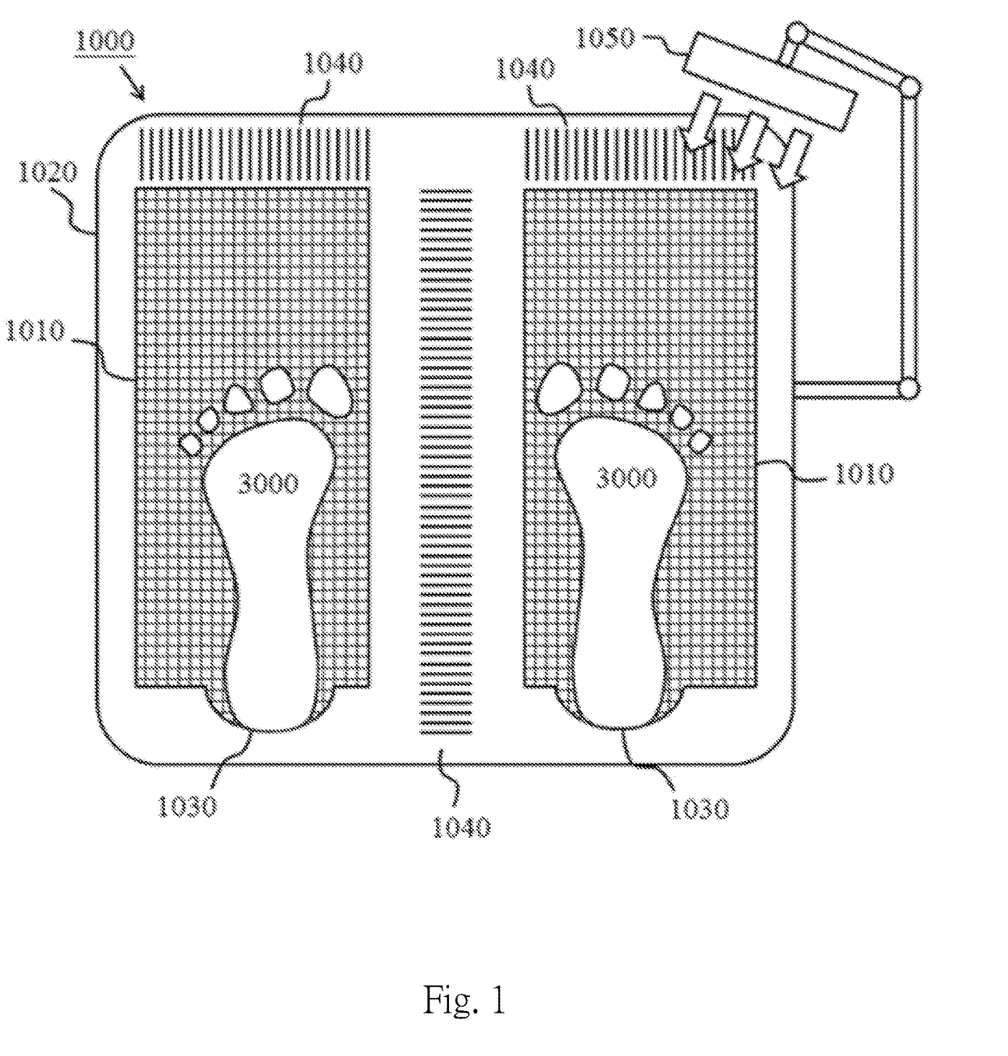
FIG. 1 is a schematic drawing of the sole measuring device 1000 according to an embodiment of the present invention.

As shown in FIG. 1, it is a schematic drawing of the sole measuring device 1000 according to an embodiment of the present invention. The sole measuring device 1000 comprises: a slow recovery memory unit 1010 configured to receive a foot sole and to create a foot print 3000; an alignment unit 1030 connected to the slow recovery memory unit 1010 used for indicating an alignment position of the foot; a scale unit 1040 connected to the slow recovery memory unit 1010 used for providing a scale mark; and a sensing unit 1050 arranged above the slow recovery memory unit 1010 used for detecting the foot print in order to provide a sole measuring information.

Accordingly, the slow recovery memory unit 1010 may be embodied to have a material with resilience such that it is able to delay in rebound and recovery in order to achieve the effect memorizing the foot print 3000 thereon; in addition, it can return to its original shape after its repetitive rebounding. In a preferred embodiment, it may be a slow recovery memory foam; however, the present invention is not limited to such type only, and other materials have the characteristic of slow recovery memory may also be utilized, such as the material of latex, silicone, colored viscous liquid contained in a clear package, polymer materials or other similar materials. In another embodiment, the slow recovery memory unit 1010 may also be configured at two symmetrical right and left sides as shown in FIG. 1 in order to allow both left foot and right foot to place thereon at the same time; however, the present invention is not limited to such configuration only, or only one side can be provided for measuring the left foot or the right foot individually, or allowing both feet to be measured at the same time. It can be understood that modifications can be made without deviating from the spirit of the present invention.

In addition, the alignment unit 1030 can be an arc mechanism as shown in FIG. 1. The alignment unit 1030 is connected to the slow recovery memory unit 1010 and used for indicating an alignment position of a measured person's foot sole 2000 shown in FIG. 3. For example, a protruding three-dimensional arc structure shown in FIG. 2 or a housing 1020 with a concave arc structure may be used as a stop for the alignment and positioning of the heel of the person being measured. Alternatively, the alignment unit 1030 may be arranged inside the housing 1020 and further connected to the slow recovery memory unit 1010. Moreover, such connection may include the methods of direct connection and indirect connection via other units. The alignment unit 1030 may be a part of the housing 1020, and the alignment unit 1030 may be a groove, and the housing 1020 may be configured to surround the slow recovery memory unit 1010, or the housing 1020 may be configured at a lower portion of the slow recovery memory unit 1010. However, it shall be understood that the housing 1020 is optional and is not an essential element of the present invention; accordingly, for the purpose of storage and portability, the housing 1020 may be removed, and the alignment unit 1030 may be also connected to or printed onto the slow recovery memory unit 1010 directly. Furthermore, the alignment unit 1030 is not limited to the arc shape, the shape could be something else, for example rectangle, trapezoid, L shape etc.

In addition, the scale unit 1040 is connected to the slow recovery memory unit 1010 to provide a scale mark. In a different embodiment, the scale unit 1040 may be configured in the longitudinal direction as shown in FIG. 1 in order to provide a longitudinal direction scale mark; the scale unit 1040 may also be configured in a transverse direction as shown in FIG. 1 in order to provide a transverse direction scale mark; the scale unit 1040 can also be configured as an oblique angle scale mark, an arc scale mark or an irregular shape scale mark in order to facilitate the recognition of the foot length, foot width or a combination thereof. The quantity of the scale unit 1040 may be configured corresponding to the quantity of the slow recovery memory unit 1010, and one slow recovery memory unit 1010 may have a plurality of corresponding to scale units 1040. In addition, the scale unit 1040 may be arranged on the housing 1020, and the scale unit 1040 may be further connected to the slow recovery memory unit 1010. The scale unit 1040 may also be connected directly to or printed onto the slow recovery memory unit 1010. In another embodiment, the sublimation transfer technology, also known as the thermal transfer technology, may be utilized for printing the scale unit 1040 onto the slow recovery memory unit 1010 directly. Similarly, the technologies of screen printing, water transfer printing, cold transfer printing etc. may also be utilized for printing the scale unit 1040 onto the slow recovery memory unit 1010. In still another embodiment, alternatively, the scale unit 1040 may also be embodied as grid marks indicated on the slow recovery memory unit 1010. In different embodiments, the scale unit 1040 may be provided as scale mark of words, numbers, symbols, drawing, other type of the scale mark or a combination thereof in order to facilitate the identification thereof. The scale mark may be different colors or different paints, and the identification effect can also be enhanced through the use of color difference, fluorescent, phosphorescence or other additional information.

Figure 2A:
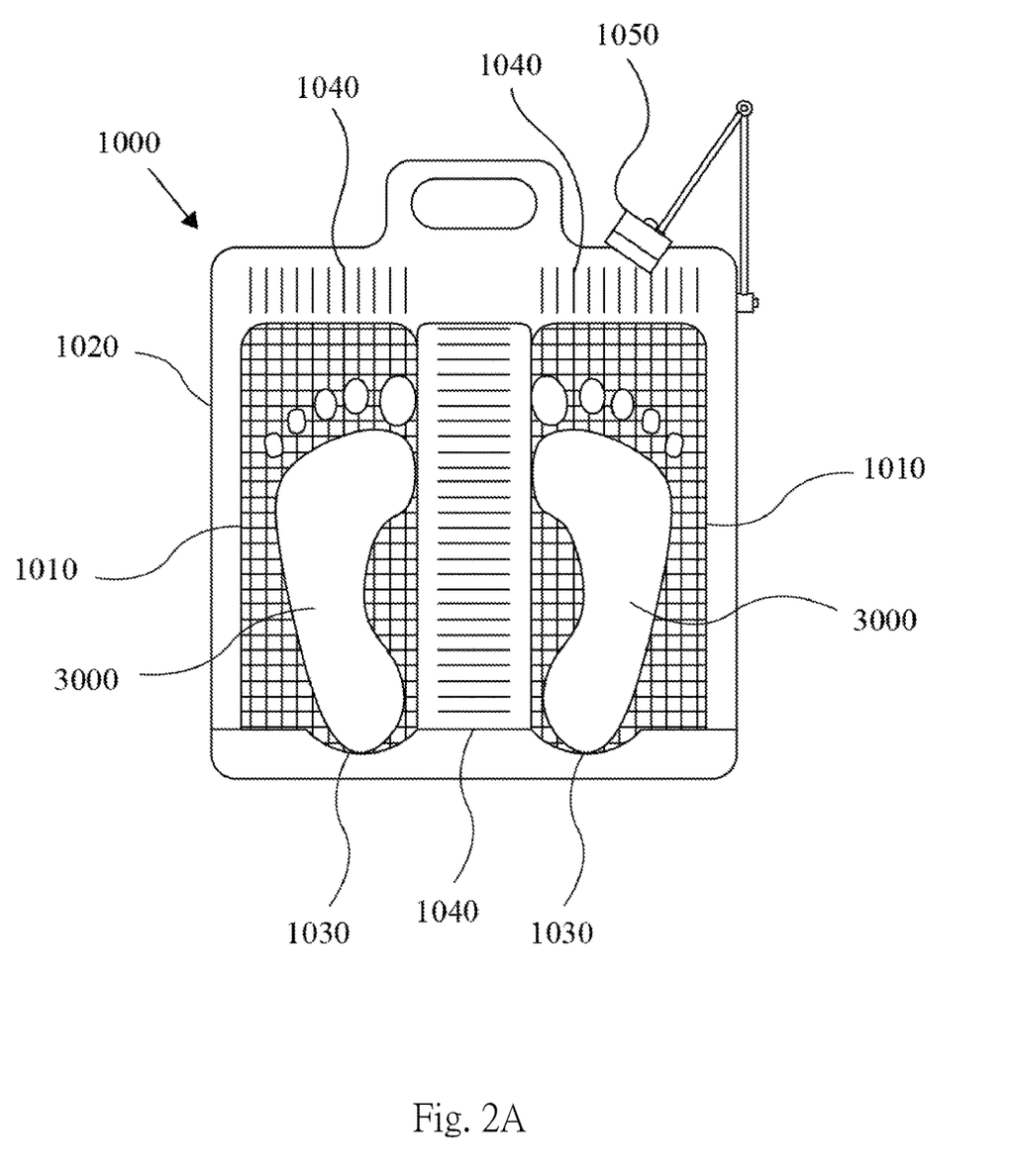
FIG. 2A and FIG. 2B show a schematic view and a perspective view respectively of the sole measuring device 1000 according to another embodiment of the present invention embodiment.
Figure 2B:
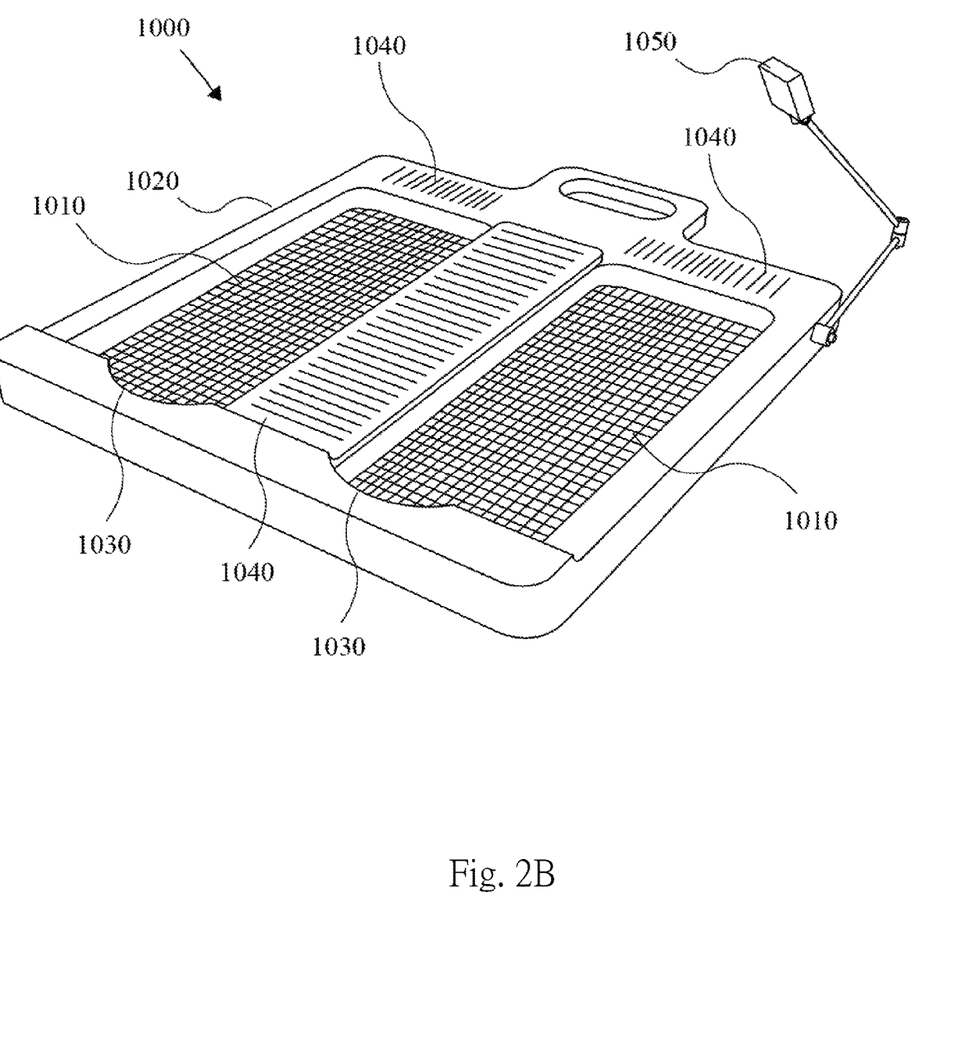

As shown in FIG. 2A and FIG. 2B, a schematic view and a perspective view of the sole measuring device 1000 according to another embodiment of the present invention embodiment are respectively illustrated. It shall be noted that the alignment unit 1030 may be configured to attach onto the housing 1020 cooperatively such that the heel is able to contact with the alignment unit 1030 while the medial edge of the foot sole leans against the center island edge of the housing 1020. The corresponding foot length and foot width may be obtained on the scale unit 1040 with the standard measurement in the foregoing description.

Figure 3A:
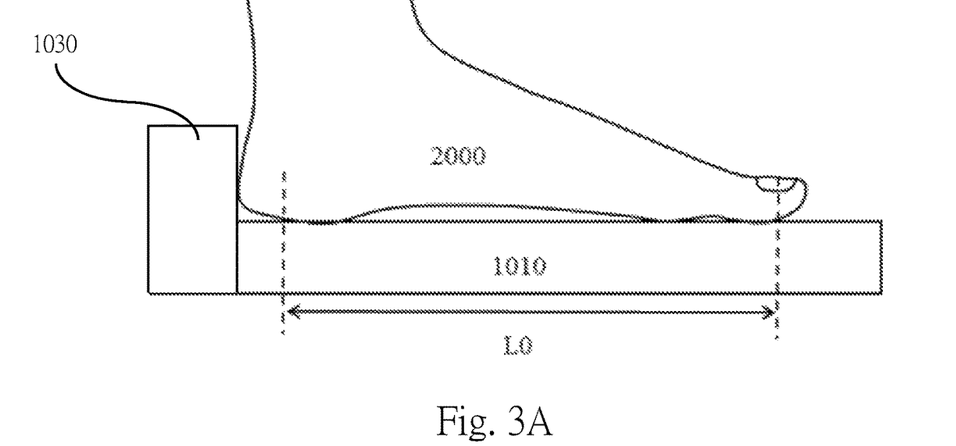
FIG. 3A to FIG. 3C show schematic views of using the sole measuring device 1000 to measure a foot length according to an embodiment of the present invention.
Figure 3B:
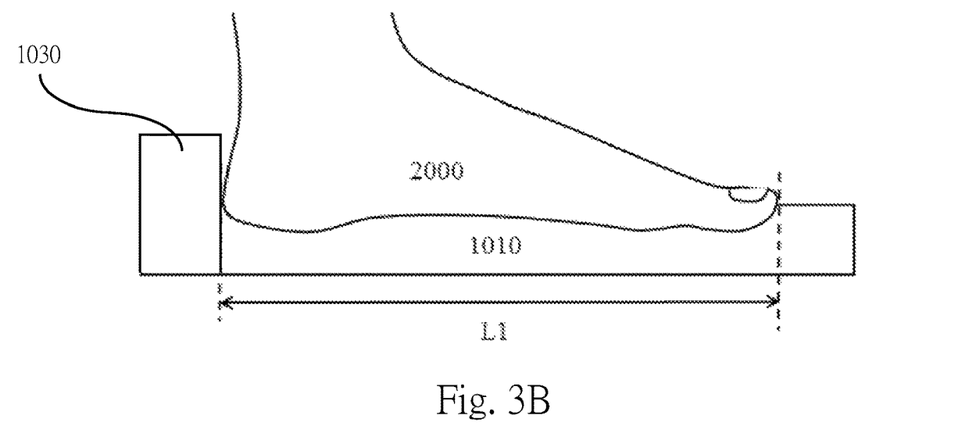
Figure 3C:
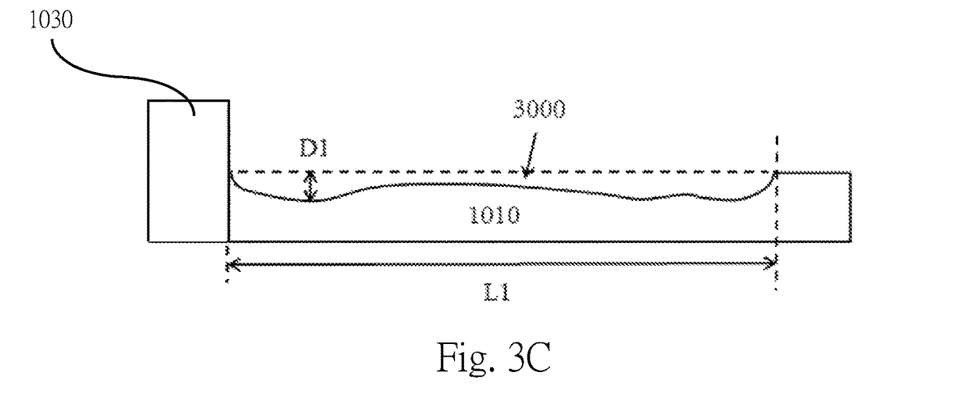

As shown in FIG. 3A to FIG. 3C, the use of the sole measuring device 1000 for measuring the foot length in the present invention embodiment is illustrated. As shown in FIG. 3A, when the measured person's foot sole 2000 contacts with the sole measuring device 1000 (for illustrative purposes, only the slow recovery memory unit 1010 is shown in the drawing, and the other unit is omitted), e.g. when the foot sole 2000 only contacts without completely stepping thereon, a length information L0 is not the maximum value of the foot sole 2000 at this moment. When the foot sole 2000 steps thereon fully, the maximum value of foot length information L1 includes the distance from the edge of the longest toe to the heel, and the maximum value of foot length information L1 at this moment refers to the maximum value of the foot length of foot sole 2000. As shown in FIG. 3C, when the foot sole 2000 moves away from the slow recovery memory unit 1010, the distribution of the area concaved, e.g. foot print 3000, reveals all information of depth D1 at all positions on the slow recovery memory unit 1010. The maximum value of foot length information L1 could be obtained from the distance between two ends of the areas concaved. One of the advantages in the present invention, e.g. the maximum value of foot length information L1 includes the distance from the edge of the longest toe to the heel could be measured by means of the resilience concave characteristic of the slow recovery memory unit 1010. If a rigid and non-resilient material is utilized, the result will be similar to the one shown in FIG. 3A, e.g. only the length information L0 is obtained from the contact point of the foot sole 2000 and the material, and the length information L0 is not the maximum value of the foot length, and the length information L0 is not the real foot length.

Figure 4A:
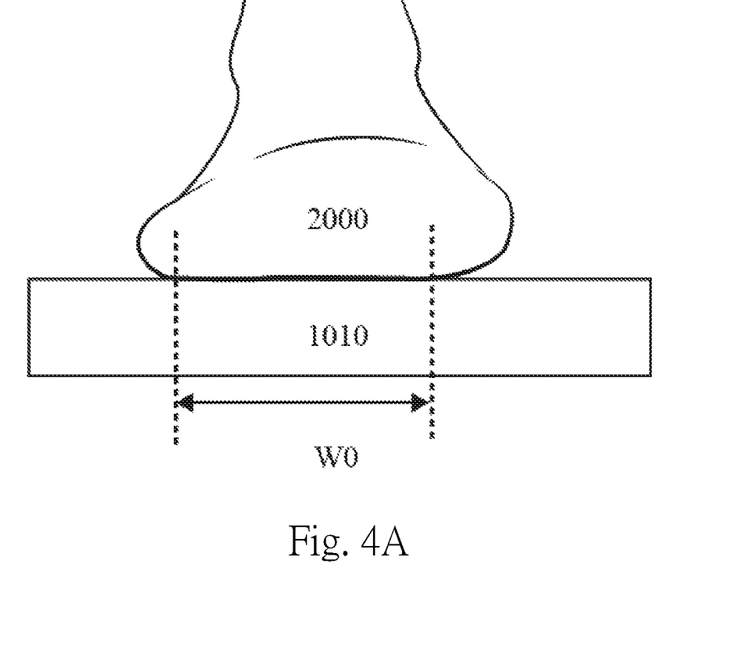
FIG. 4A to FIG. 4C show schematic views of using the sole measuring device 1000 to measure the foot width according to an embodiment of the present invention.
Figure 4B:
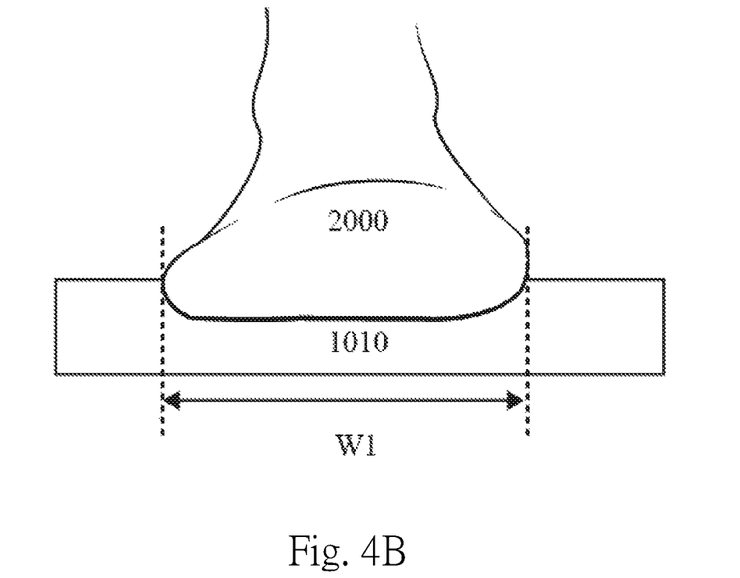
Figure 4C:
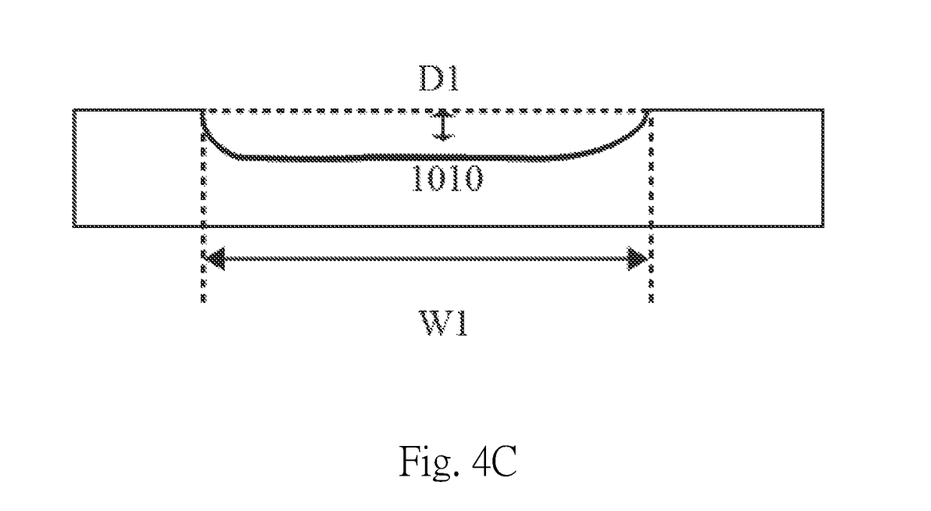

As shown in FIG. 4A to FIG. 4C, the use of the sole measuring device 1000 for measuring the foot width according to an embodiment of the present invention is illustrated. In FIG. 4A, it shows the condition where the sole contacts the slow recovery memory unit 1010 initially, and such condition is identical to the sole measuring device with rigid surface in the prior technique, e.g. the sole measuring device in the prior technique is only able to measure a width information of sole surface W0. By means of the resilience concave characteristic of the slow recovery memory unit 1010, after the foot sole treading, the maximum value of foot width information W1 is equal to the maximum value including the edge of the ball of foot can be measured. The rest of the description thereof is similar to the foregoing description such that it is omitted hereafter.

Figure 5A:
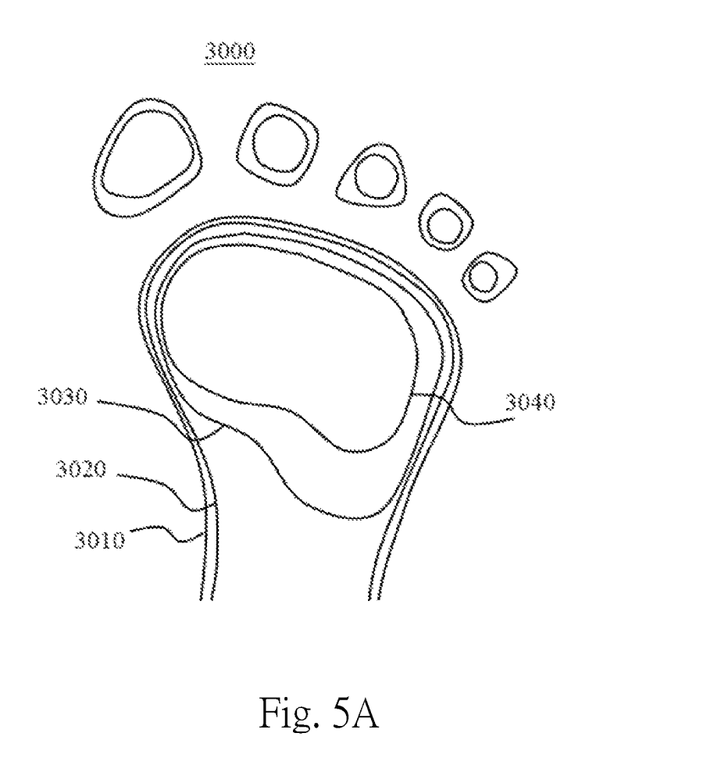
FIG. 5A is a schematic view of using the sole measuring device 1000 to measure the depth according to an embodiment of the present invention.

As shown in FIG. 5A, using sole measuring device 1000 for measuring the different depths according to an embodiment of the present invention is illustrated. As shown in FIG. 5A, since the sole surface is not a plane, the presentation of the foot print 3000 after stepping thereon includes different depths (for example, the depth information D1). In an example of a foot sole and a thick slow recovery memory unit 1010, i.e. a first depth of foot print 3010 which is also identical to the profile of foot print, a second depth of foot print 3020, a third depth of foot print 3030, a forth depth of foot print 3040 etc. In general, the maximum value of foot length information L1 and the maximum value of foot width information W1 may include the calculation based on the most outside edge of the first depth of foot print 3010 due to that the most outside edge of the first depth of foot print 3010 can include the edge position of the foot sole 2000, e.g. the real edge position of the foot sole. Accordingly, due to the difference in the depth of stepping, a foot sole print and a toes print of the foot print 3000 may be continuous or discontinuous. It can be understood that the two most outside edges from the longest toe to the heel shall be included in order to obtain the distance between them during the obtaining of the maximum value of foot length information L1.

Figure 5B:
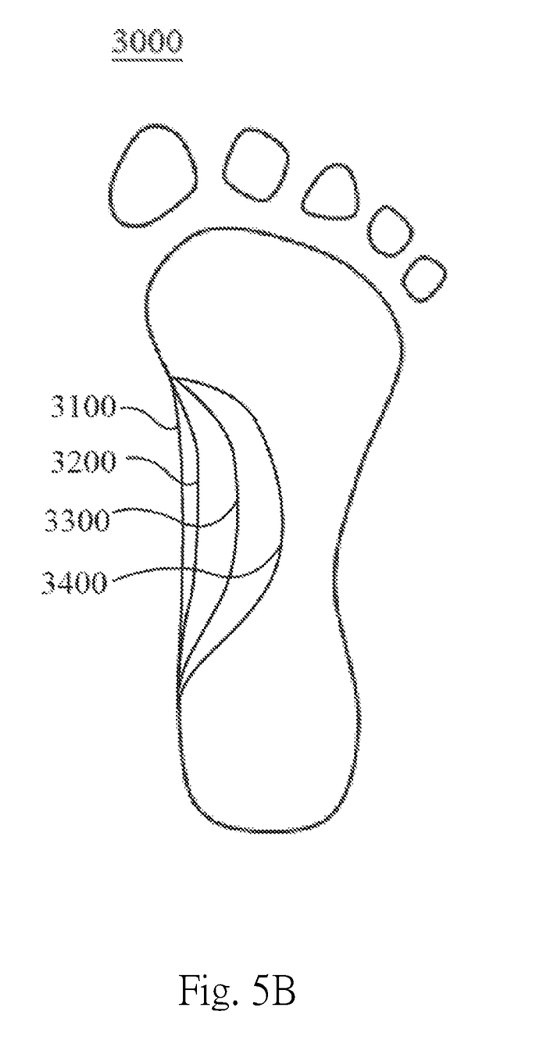
FIG. 5B is a schematic view of using the sole measuring device 1000 to measure the foot arch according to an embodiment of the present invention.

As shown in FIG. 5B, using the sole measuring device 1000 to measure the foot arch according to an embodiment of the present invention is illustrated. Accordingly, the foot print 3000 generated by the measured person with different foot type may be a foot print of flat-foot 3100, a foot print of low arch 3200, a foot print of medium arch 3300 (or also called neutral foot print), or a foot print of high arch 3400. The foregoing four types of foot print may also be simplified into three main categories, e.g. selecting anyone of flat foot or low arch. As a result, the different foot print 3000 can be obtained from the sole measuring device 1000 of the present invention in order to obtain the arch information from the person being measured.

Figure 6:
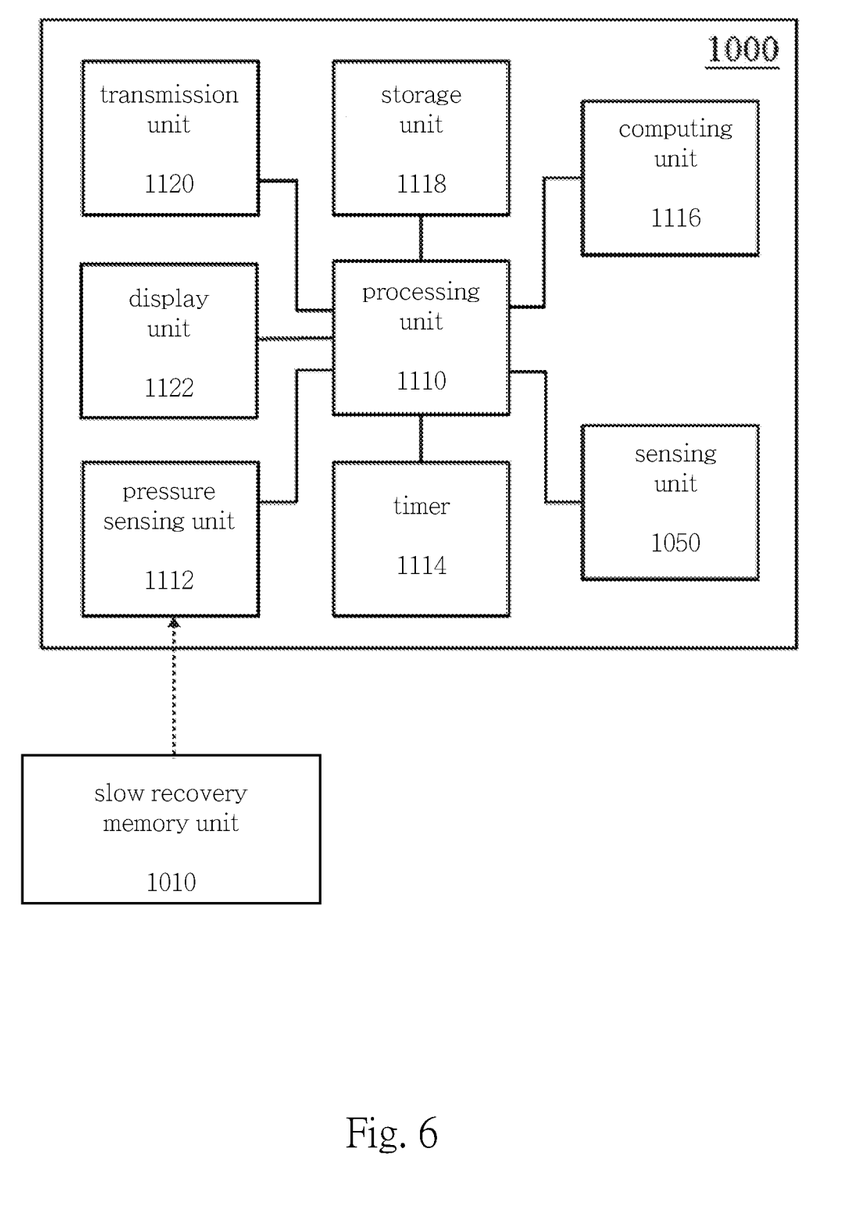
FIG. 6 is a block diagram of the sole measuring device 1000 according to an embodiment of the present invention.

As shown in FIG. 6, a block diagram of the sole measuring device 1000 according to an embodiment of the present invention is illustrated. In this embodiment, the sole measuring device 1000 comprises: a processing unit 1110, a pressure sensing unit 1112 connected to the processing unit 1110 and attached onto the slow recovery memory unit 1010, a timer 1114 connected to the processing unit 1110, aforementioned sensing unit 1050 connected to the processing unit 1110, a computing unit 1116 connected to the processing unit 1110, a storage unit 1118 can be connected to the processing unit 1110, a transmission unit 1120 connected to the processing unit 1110 and a display unit 1122 connected to the processing unit 1110. Particularly, the connection may be an electrical connection or an optical connection.

In addition, the pressure sensing unit 1112 is used for detecting that the foot sole 2000 stepping onto and moving away from the slow recovery memory unit 1010. For example, the pressure sensing unit 1112 may be any type of the pressure detector such as a pressure switch, but it is not limited to such type only. The storage unit 1118 is stored with a special time interval information, such as the time of one second, and the storage unit 1118 is configured in such a way that the processing unit 1110 commands the sensing unit 1050 to detect the foot print 3000 when the pressure sensing unit 1112 detects that the foot sole 2000 has moved away from the slow recovery memory unit 1010 and when the timer 1114 detects the special time interval being satisfied in order to prevent the sensing unit 1050 from capturing that the foot has not moved away from the slow recovery memory unit 1010. It can be understood that the timer 1114 may also be omitted such that the processing unit 1110 commands the sensing unit 1050 to detect the foot print 3000 when the pressure sensing unit 1112 detects the foot sole 2000 after it has moved away therefrom.

The processing unit 1110 could be any type of processing units, such as a microprocessor, an embedded processor, a chip, a processing circuit etc. The storage unit 1118 may be loaded with an operation system, an application program etc., or the storage unit 1118 may be an embedded device. The sole measuring device 1000 may also utilize the transmission unit 1120, and the transmission unit 1120 is connected to a PC (personal computer), a NB (notebook), a server, a workstation, a smartphone, a cloud computing etc. through wired or wireless network. For example, the sensing unit 1050 may be used by a smartphone to download the application program. After the camera of the smartphone is utilized to take a picture and capture an image, the image is analyzed and the foot print 3000 is detected to provide the information of foot sole measurement. Alternatively, cloud computing may be utilized to at least perform the aforementioned functions of the processing unit 1110 and/or functions of the computing unit 1116.

Figure 7:
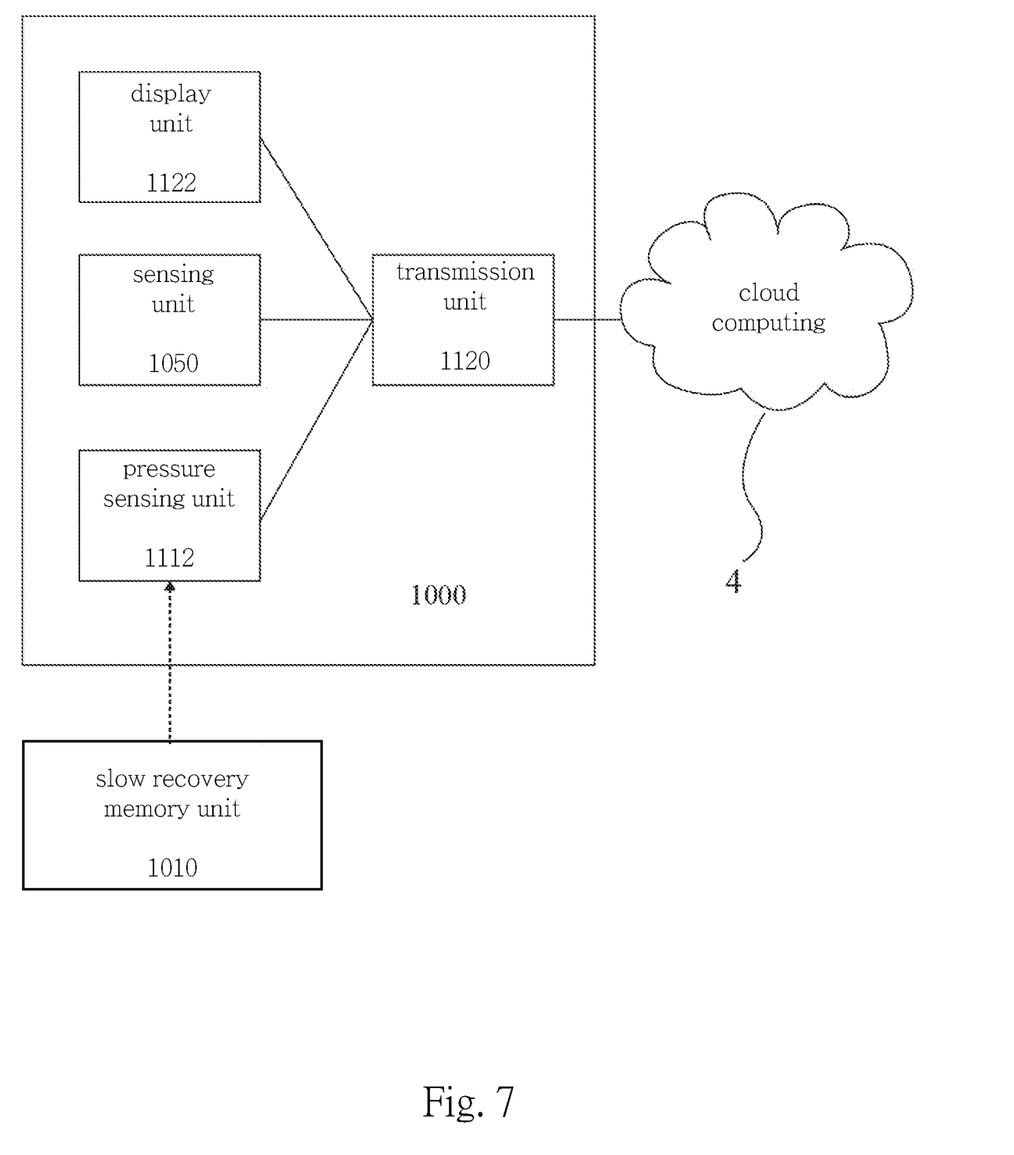
FIG. 7 is a block diagram of the sole measuring device 1000 according to the other embodiment of the present invention.

To be more specific, as shown in FIG. 7, the sensing unit 1050, the pressure sensing unit 1112 and the display unit 1122 may be connected to the transmission unit 1120, and the transmission unit 1120 may be connected to a cloud computing 4, such that the cloud computing 4 may perform the functions of the storage unit 1118, the timer 1114, the processing unit 1110 and/or the computing unit 1116. Alternatively, the function of the storage unit 1118, the timer 1114, the processing unit 1110 and the computing unit 1116 may be performed by the cloud computing 4, and the other functions may be built-in the functions of the sole measuring device 1000.

The sensing unit 1050 may be any one of an optical sensor, a distance sensor, a temperature sensor and a combination thereof. The term of "sensor" or "sensing unit"

recited here may also include a transmitter and a receiver with corresponding technical characteristics. For example, the optical sensor may be any one of a CCD unit (Charge Coupled Device) sensor, a Complementary Metal-Oxide Semiconductor (CMOS) sensor and other sensors. The distance sensor may be any one of a ultrasonic sensor, a laser sensor and other sensors; for example, a device using a depth sensing function of a dynamic sensing unit, such as Microsoft Kinect or Intel RealSense camera. The temperature sensor may be any one of an infrared sensor and other sensor etc., such as a black body radiation sensor, an Infrared Thermographer, ex. the thermographer of FLIR, SEED etc. In some embodiments, alternatively, the sensing unit 1050 may be utilized through a rotatable bracket connected with the housing 1020. In addition, the rotatable bracket may be configured that the rotatable bracket moves auto-controlled by the processing unit 1110.

Accordingly, the sensing unit 1050 may detect the foot print 3000, and the foot print 3000 is set to detect the maximum value of foot length information L1 in the margin, the maximum value of foot width information W1 etc., e.g. the measured person's foot length information and the foot width information of the foot sole 2000. In case where the images of the toes and the foot sole are discontinuous, the two ends with the greatest distance in the longitudinal direction are set to be the calculation basis. In a different embodiment, if an image difference is used for determination, the processing unit 1110 may be used to identify the scale mark. If the depth information D1 is utilized, it is able to determine a three-dimensional (3D) information in depth in order to obtain greater relevant information of the foot print 3000. In another embodiment, the heat of the human body is conducted into the foam, which can be stored temporarily in the gap of the fluffy foam due to the resilience of the memory foam during the time when the foot sole 2000 just move away from the slow recovery memory unit 1010 after stepping thereon. Accordingly, the sensing unit 1050, for example the thermographer of FLIR, SEED etc., can detect an infrared image signal of the body temperature retained temporarily inside the slow recovery memory unit 1010, therefore the foot print can be identified more precisely.

Further, during the determination of the foot arch type, a portion of the foot sole area may be captured without the area of the toes, and a portion of the foot sole area may be calculated as a ratio value between an arch area of the captured image and a total area of the captured image. It shall be understood that for foot print of high arch 3400, the ratio value shall be lower than the one for the foot print of low arch 3200, and value of the ratio may be obtained through training. After a range of the ratio values are obtained through training, the high arch, the medium arch and the low arch (or flat foot) can be classified based on the ratio value, and the foot arch type can be determined in accordance with the ratio value during the use of the present invention. However, the present invention is not limited to such configuration only, a contour of the foot print 3000 may be utilized for determination, and other rules can also be utilized for the determination.

In a preferred embodiment, the sensing unit 1050 may be configured directly on top of the slow recovery memory unit 1010; alternatively, the sensing unit 1050 may also be configured on top of one side of the slow recovery memory unit 1010. The image correction algorithm is utilized for correcting the deflection data captured from the direction on top of one side of the slow recovery memory unit 1010 into the image captured directly on top of the slow recovery memory unit 1010 similarly. Furthermore, the sensing unit 1050 is not limited to one unit only, and a plurality of sensing unit 1050 may be utilized in combination, and the sensing unit 1050 may also be configured with different height, angle, horizontal position etc.

Accordingly, in an embodiment of the present invention, a high resolution sensing unit 1050 may be utilized to obtain high resolution sole measuring information. The slow recovery memory unit 1010 used is nearly unaffected by the operation temperature variation. The measurement procedure is simplified, and the measured person's foot is not required to undergo special process, and the measurement procedure can be achieved with the measured person wearing or not wearing socks. The foot print 3000 can be created simply by stepping onto the memory unit and moving away from the unit. Furthermore, the resilience concave characteristic of the slow recovery memory unit 1010 can be utilized. The information of the most outside edge of the sole of the foot sole 2000 can be measured, and the information can be three-dimensional (3D) information. Moreover, the slow recovery memory unit 1010 can be repetitively used with ease.

The above describes the preferred embodiments of the present invention. However, not all of the elements or steps are essential technical features, and all details of the technical features may not have been described completely. All units and steps described are provided as examples only, and they may be modified by a person ordinarily skilled in the art of the technical field of this patent application. The scope of the present invention shall be defined by the claims thereof.

What is claimed is:

1. A sole measuring device, comprising:
    a slow recovery memory unit configured to receive a foot sole and to create a foot print;
    an alignment unit connected to the slow recovery memory unit and used for indicating an alignment position of the foot sole; and
    a scale unit connected to the slow recovery memory unit and used for providing a scale mark.

2. The sole measuring device according to claim 1, further including a sensing unit arranged on top of the slow recovery memory unit and used for detecting the foot print in order to provide a sole measuring information.

3. The sole measuring device according to claim 2, wherein the sensing unit is an optical sensor.

4. The sole measuring device according to claim 2, wherein the sensing unit is a distance sensor.

5. The sole measuring device according to claim 2, wherein the sensing unit is a temperature sensor.

6. The sole measuring device according to claim 2, wherein the sole measuring information is any one of a foot length information, a foot width information, an arch information or a combination thereof.

7. The sole measuring device according to claim 2, further comprising a processing unit and a pressure sensing unit; wherein the processing unit is connected to the pressure sensing unit, the pressure sensing unit is combined with the slow recovery memory unit, and the sole measuring device is configured in such a way that when the pressure sensing unit detects that the foot sole has moved away from the slow recovery memory unit, then the processing unit further commands the sensing unit to detect the foot print.

8. The sole measuring device according to claim 2, further comprising a processing unit, a pressure sensing unit, a timer and a storage unit; wherein the pressure sensing unit, the timer and the storage unit are connected to the processing unit, the pressure sensing unit is attached onto the slow recovery memory unit, the storage unit is stored with a special time interval information, and the sole measuring device is configured in such a way that when the pressure sensing unit detects that the foot sole has been moved away from the slow recovery memory unit and the timer detects the special time interval being satisfied, then the processing unit further commands the sensing unit to detect the foot print.

9. The sole measuring device according to claim 2, further comprising a pressure sensing unit and a transmission unit; wherein the pressure sensing unit is attached onto the slow recovery memory unit, and the pressure sensing unit is connected to the transmission unit, the transmission unit is connected to a cloud computing via a wired or a wireless method, and the sole measuring device is configured in such a way that when the pressure sensing unit detects the foot sole moving away from the slow recovery memory unit, then the cloud computing commands the sensing unit to detect the foot print.

10. The sole measuring device according to claim 2, further comprising a housing configured to surround the slow recovery memory unit or configured at a lower portion of the slow recovery memory unit.

* * * * *